Feb. 20, 1962     H. L. DOBRIKIN     3,022,118

RELAY VALVE

Filed Dec. 22, 1959

INVENTOR.
Harold L. Dobrikin,
BY Parker & Carter
Attorneys.

United States Patent Office 3,022,118
Patented Feb. 20, 1962

3,022,118
RELAY VALVE
Harold L. Dobrikin, Chicago, Ill., assignor to Berg Airlectro Products Company, Chicago, Ill., a corporation of Illinois
Filed Dec. 22, 1959, Ser. No. 861,264
8 Claims. (Cl. 303—40)

This invention relates to valves, and has particular relation to a relay valve.

One purpose is to provide a relay valve of maximum compactness and simplicity.

Another purpose is to provide a relay valve having a housing and a cap therefor, with all the parts of the valve being removable outwardly from said housing upon removal of said cap therefrom.

Another purpose is to provide a relay valve in which all of the movable parts thereof may be removed without disturbing the connections to said valve.

Other purposes will appear from time to time during the course of the specfication and claims.

I illustrate my invention more or less diagrammatically in the accompanying drawings, wherein.

Like parts are indicated by like numerals throughout the specification and drawings.

Figure 1:
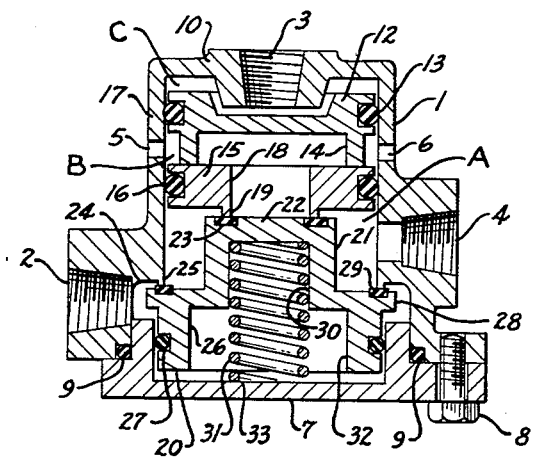
FIGURE 1 is a cross section.

Referring now to the drawings, and particularly to FIGURE 1, the numeral 1 generally indicates a cup-shaped valve housing. The housing 1 has formed thereon a plurality of threaded passage means comprising openings in the wall of housing 1, indicated at 2, 3 and 4. Each of the passage means 2, 3 and 4 communicate with the interior of housing 1. Vent openings, indicated at 5 and 6, are also formed in the wall of housing 1 between the passage 3 and passages 2 and 4. An end cap 7 is secured to the open end of housng 1 by any suitable means such as the bolt 8. A seal 9 is clamped between the housing 1 and cap 7 to seal the interior of housing 1 when the cap 7 is in place thereon.

The passage 3 is formed in the end wall 10 of housing 1 and has an inwardly extending annulus 11 surrounding the passage 3 within the housing 1.

Reciprocally positioned within housing 1 with an unbroken surface opposed to passage 3 is a valve piston 12 which carries a piston seal ring which may, for example, be an O-ring 13. A plurality of circumferentially spaced legs 14 are formed on piston 12 and extend therefrom in the direction opposite from that surface opposed to passage 3.

Within the housing 1 is a second valve piston 15 carrying the seal 16 in engagement with the inner surface of the cylindrical wall 17 of housing 1 in the manner of seal 13. The piston 15 is in contact with legs 14 at one of its annular surfaces, and is centrally apertured as at 18. A valve seat 19 is formed on the surface of piston 15 opposite to that in contact with the legs 14 and surrounds the aperture 18.

A third valve piston 20 has a cylindrical portion 21 having a diameter substantially less than the inner diameter of housing 1 and carrying at one end an end wall 22 which in turn carries a valve cushion member 23 positioned to seat upon the valve seat 19.

The inner surface of housing wall 17 has formed therein an annular outwardly offset enlarged portion 24 with which passage 2 communicates. A valve seat 25 is formed in the inner surface of housing wall 17 along an edge of enlarged wall surface 24 nearest the passage 3 or at the point of juncture between the major segment of wall 17 and the offset 24.

Piston 20 has an enlarged cylindrical portion 26 carrying a seal ring 27 in contact with the inner surface of an inwardly extending cylindrical cap extension 7a of cap 7. It will be observed that cap extension 7a terminates short of valve seat 25 and forms with the offset wall portion 24 what is in effect an inner, annular groove 24a with which passage 2 communicates. Between piston portions 21 and 26 the piston 20 has an annular flange 28. The flange 28 extends into groove 24a and carries on one surface thereof a valve cushion member 29 positioned to seat upon valve seat 25.

The cylindrical portion 21 defines an inner well 30 in which a spring 31 is seated. The spring 31 extends through a larger well 32 defined by cylindrical portion 26 and has its opposite end in contact with the inner surface of cap 7, as indicated at 33.

It will be observed that the differences in diameter between that of piston portion 21 and cylindrical housing wall 17 defines a chamber A with which the groove 24a communicates when valve 29 is off its seat 25, and with which passage 4 communicates at all times. It will further be observed that vent means 5, 6 communicate at all times with a chamber B formed between pistons 12 and 15. A chamber C is formed between piston 12 and the opposed inner surface of housing end wall 10.

Whereas I have described and claimed a practical and operative devce, nevertheless many changes may be made in size, shape, number and disposition of parts. I therefore wish my description and drawings to be taken as in a broad sense illustrative or diagrammatic, rather than as limiting me to my precise showing.

The use and operation of my invention are as follows:

Passage 2 is connected to a source of supply of constant pressure, such as an air system of a vehicle, for example that of a tractor-trailer combination vehicle. Passage 3 is connected to the service line of such an air pressure system. Passage 4 is connected to a brake chamber to which the air pressure is directed for employment. The vents 5, 6 are opened to atmosphere.

Figure 2:
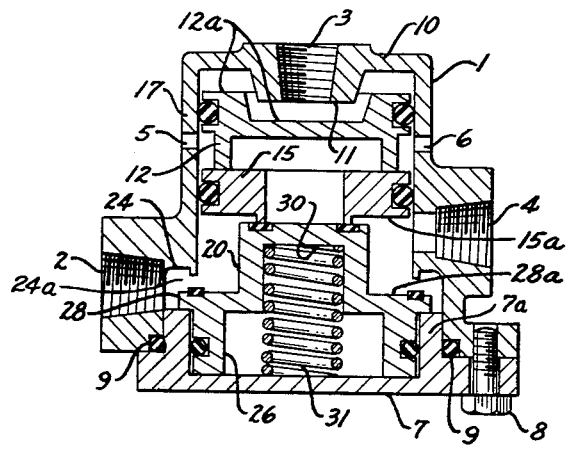
FIGURE 2 is a cross section with the valve parts in another position.

Under ordinary circumstances, such as that illustrated in FIGURE 2, the valve cushion 25 is off its seat 29. Air pressure entering through passage 2 is thus permitted to flow through groove 24a and chamber A about piston 21 and thence outwardly through passage 4 for operation of the brakes of a vehicle, for example. Service air pressure entering through passage 3 is exerted against the opposed surface 12a of piston 12, fills chamber C, and thus urges and holds the parts in the position illustrated in FIGURE 2 against the action of spring 31.

Upon build-up of pressure in chamber A beyond that usable by mechanism connected at passage 4, the increased pressure, overcoming that entering through passage 3, is effective to operate against opposed surfaces 28a of piston 20 and 15a of piston 15 to cause valve seat 19 to move off the valve cushion member 23 and thus open chamber A to the vents 5, 6 through aperture 18 and chamber B.

Upon loss of service air pressure the spring 31 is effective to return valve seat cushion member 29 to its closed position upon seat 25, thus sealing off passage 2 against the entering of additional air pressure from the pressure system. The same action is effective to maintain valve cushion 23 on seat 19, and thus prevent the loss of air from the brake system through passage 4, chamber A, aperture 18, chamber B, and vents 5, 6.

I claim:

1. A relay valve comprising a cup-shaped housing, an air passage formed in the base wall of said housing, an air pressure inlet formed in the side wall of said housing, an air pressure outlet formed in the side wall of said housing, a valve seat formed in the wall of said housing between said inlet and said outlet, a piston movable within said housing and having a valve portion positioned to seat upon said valve seat, an atmospheric vent opening formed in said housing wall between said air passage and said outlet, a second piston movable in said housing between said vent opening and said outlet, said second piston having an aperture therethrough, a second valve seat formed about said aperture, a second valve element on said first piston positioned to seat upon said second valve seat, yielding means in said housing positioned to urge said first piston toward said second piston, a third piston movable in said housing and positioned between said second piston and said air passage, and between said vent openings and said third passage, said third piston having spaced abutment means in contact with said second piston.

2. A relay valve comprising a cup-shaped housing, said cup-shaped housing having a base wall, a side wall and an open end opposite said base wall, an air pressure inlet formed in said side wall, an air pressure outlet formed in said side wall axially spaced from said inlet, an atmospheric vent opening formed in said side wall axially spaced from said inlet and said outlet, an air passage formed in said base wall, a first piston axially slideable in said housing adjacent said open end, a second piston axially slideable in said housing between said outlet and said vent opening, a third piston axially slideable in said housing between said vent opening and said air passage and a cap adapted to close said open end, each of said pistons being freely removable from said housing through said open end upon removal of said cap.

3. The relay valve of claim 2 further characterized by and including a valve seat formed in said side wall between said inlet and said outlet, said first piston having a valve portion positioned to seat upon said valve seat, said second piston having an aperture extending generally axially therethrough, a second valve seat formed about said aperture, a second valve portion on said first piston positioned to seat upon said second valve seat and abutment means on said third piston in contact with said second piston and permitting continual communication between said aperture and said vent opening.

4. The relay valve of claim 3 further characterized by and including spring means in said housing extending between said cap and said first piston tending to urge said first piston towards said second piston.

5. A relay valve comprising a cup-shaped housing, said housing having a generally cylindrical side wall, a closed base wall and an open end, a cap for said open end, an air pressure inlet in said side wall, an air pressure outlet in said side wall axially spaced from said inlet, an annular groove formed in the inner surface of said side wall in communication with said inlet, a valve seat formed at the edge of said groove axially between said inlet and said outlet, a first piston reciprocally movable in said housing and having a flange extending into said groove, an atmospheric vent opening in said side wall axially spaced from said outlet, a second piston reciprocally movable in said housing between said outlet and said vent opening, an aperture extending axially through said second piston, said first piston adapted to engage said second piston and seal said aperture, an air passage formed in said closed end wall, a third piston reciprocally movable in said housing between said vent opening and said air passage, said third piston including abutment means adapted to contact said second piston while permitting continuous communication between said aperture and said vent opening.

6. The valve of claim 5 further characterized by and including spring means extending between said cap and said first piston, said spring means adapted to bias said first piston towards said second and third piston and said flange into engagement with said valve seat.

7. The valve of claim 6 further characterized in that said first piston, said second piston, said third piston and said spring means are slidably removable from said open end upon removal of said cap.

8. A relay valve comprising a valve housing, a pair of piston elements movable within said housing, one of said piston elements having a reduced cylindrical portion forming with the inner wall of said housing an annular chamber, the other of said pistons having a central aperture and a valve seat surrounding the end of said aperture adjacent said reduced first piston portion, said first piston portion carrying valve portion positioned to seat upon said valve seat, said pistons having opposed annular surfaces defining with the inner wall of said housing said annular chamber, an air pressure inlet in said housing positioned to communicate with said chamber when said first piston is in one position, an air pressure outlet in said housing communicating with said chamber in all positions of said pistons, a second valve seat at the end of said chamber opposite that defined by said second piston, a valve portion carried by said first piston and positioned to seat upon said last named valve seat at another position of said first piston, a third piston element movable in said housing and having abutment means adapted to engage said second piston, an air vent opening in said housing between said second piston element and said third piston element, said air vent opening being in constant communication with said central aperture and a service air pressure passage in said housing adjacent said third piston, air under pressure admitted therethrough biasing said third piston into engagement with said second piston.

References Cited in the file of this patent
UNITED STATES PATENTS

| | | |
|---|---|---|
| 2,459,456 | Rockwell | Jan. 18, 1949 |
| 2,624,361 | Brown | Jan. 6, 1953 |
| 2,806,481 | Faust | Sept. 17, 1957 |
| 2,888,027 | Gerwig et al. | May 26, 1959 |